Nov. 29, 1949     S. BRECHER     2,489,477

FASTENER DEVICE FOR PICTURE FRAMES

Filed May 15, 1946

INVENTOR.
SAMUEL BRECHER

BY

ATTORNEY

Patented Nov. 29, 1949

2,489,477

UNITED STATES PATENT OFFICE 2,489,477

FASTENER DEVICE FOR PICTURE FRAMES

Samuel Brecher, New York, N. Y.

Application May 15, 1946, Serial No. 670,014

3 Claims. (Cl. 40—156)

This invention relates to a fastener device for securing canvas mountings, artist boards, mirrors, or the like within picture frames.

One of the principal objects of the invention is to provide a universal fastener which may be readily adjusted to the various conditions caused by dimensional differences in either the picture frames, the canvas mountings, canvas boards or other inserts that are to be held within the frames. The dimensional variation in picture frames on the market is due to differences in the extent of recessing of the ledge upon which the insert, such as the canvas mounting or board, is rested, resulting in differences in the distance between the rear face of the picture frame and the ledge. Canvas mountings and boards are also produced in different thicknesses. By reason of these dimensional variations, picture frames and canvas mountings or boards may be combined to present various conditions calling for adjustability of the fastener device to make it universal. For example, a picture frame, especially one having a shallow ledge recess, may be combined with a canvas mounting, especially one having a stretcher of considerable thickness, so that the rear face of the stretcher projects rearwardly of the rear face of the picture frame; or, a picture frame, especially one having a deep ledge recess, may be combined with a canvas mounting to present substantially flush rear faces; or a picture frame may be combined with a canvas board or a glass mirror so that the rear face thereof is depressed in the ledge recess forwardly of the rear face of the picture frame. This object of the invention is to provide a fastener device which will be universal in that it is readily adjustable for any one of the three conditions stated, and also for dimensional variations as to picture frames and inserts themselves.

Further objects of the invention are to provide a universally adjustable fastener device as described which may be easily and quickly applied; which may be cheaply manufactured; which will require the use of a relatively few units in securing the canvas mounting or other member within the picture frame; which will firmly hold the inserted member in place in its frame; which will not mar or injure either the picture frame or the inserted member; and which will present no rearwardly protruding parts which might interfere with the handling, hanging or stacking of picture frames, or which might do damage to rearwardly stacked frames or pictures.

For the attainment of the foregoing and such other objects of invention as may appear or be pointed out herein I have shown two embodiments of my invention in the accompanying drawing, wherein Figure 1 is a perspective view of the improved fastener device constituting a preferred form of my invention;

Figure 1:
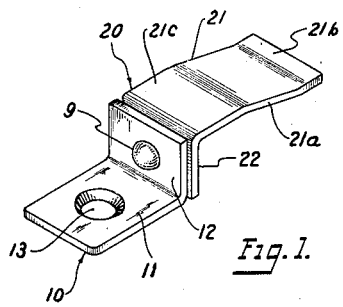

The improved fastener device comprises a pair of L-shaped members or angle bars 10, 20, as best seen in Figure 1, said members having, in the preferred form illustrated, long oppositely extending legs or flanges 11, 21, respectively, and short adjacent legs or flanges 12, 22, respectively. The short flanges 12, 22 of the two members are in face to face relation and are pivotally articulated together, as by the rivet 9, so that the members may be angularly turned relatively to each other. Member 10 is preferably, although not necessarily, fabricated of rigid non-resilient material, while the other member 20 is preferably made of resilient or springy material, so that its long flange 21. which in the preferred form is bent downwardly along the intermediate inclined portion 21a, will be resilient so that its preferably flat distal end 21b may flex upwardly. The long flange 11 of rigid member 10 is provided with an aperture 13 near its distal end.

Figure 3:
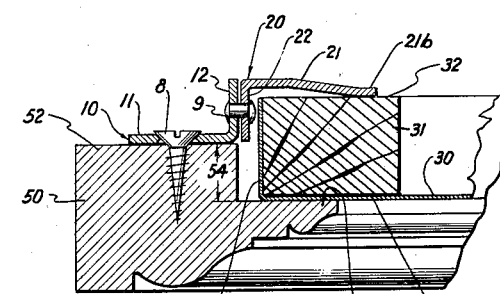
Figure 3 is an elevational section taken on the line 3—3 of Figure 2, showing the device adjusted for a canvas mounting the stretcher of which projects rearwardly of the rear face of the picture frame.
Figure 2:
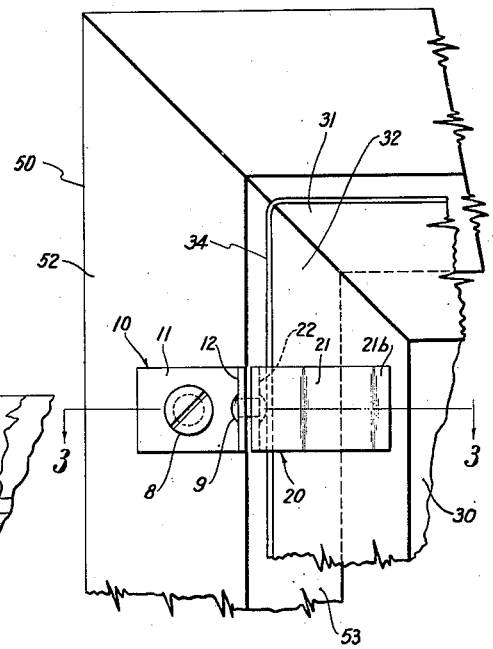
Figure 2 is a top view thereof in place on a picture frame and canvas mounting; only a fragmentary corner of the picture frame being shown.
Figure 4:
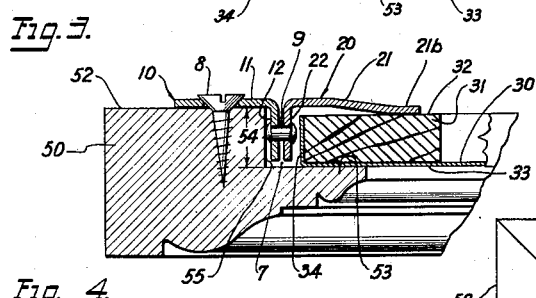
Figure 4 is an elevational section similar to Figure 3, but showing the device adjusted for substantially flush rear faces.
Figure 5:
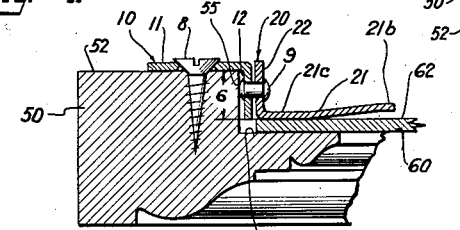
Figure 5 is an elevational section similar to Figures 3 and 4, but showing the device adjusted for a thin insert such as a canvas board the rear face of which is depressed forwardly in the ledge recess of the picture frame.
Figure 7:
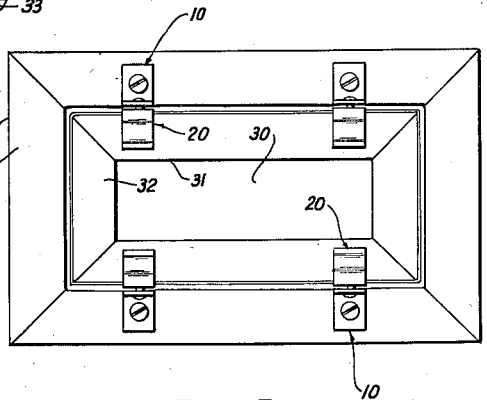
Figure 7 is a diagrammatic representation of of picture frame showing a number of fastener devices disposed for holding the insert in place.

By reason of the pivotal articulation at 9 between the two members, they may be angularly turned relatively to one another so that the device may be given any desired one of the three arrangements shown in Figures 3, 4 and 5. These figures represent the three conditions (described in the statement of invention) for which the device may be adjusted, so that it is universally adapted for all three conditions.

Figure 3 represents the conditions in which the rear face 32 of a stretcher frame 31 upon which a canvas 30 is mounted, projects rearwardly of the rear face 52 of a picture frame 50. The front face 33 of the stretcher rests on ledge 53 of the frame, the ledge being recessed from rear face 52 a distance designated 54. The improved fastener device is adjusted for the rearwardly projecting condition of Figure 3 by angularly turning the two members so that their long flanges are disposed in parallel planes spaced apart a distance equal to the short flanges, resulting in a Z shape in which long rigid flange 11 constitutes the lower horizontal leg and long resilient flange 21, the upper horizontal leg. The Z-shaped device is positioned with the short flanges disposed close to the rearwardly projecting portion of the wide wall 34 of the stretcher 31, so that rigid flange 11 rests on rear face 52 of the picture frame with resilient flange 21, or rather its flat distal end 21b, resting on the rear face 32 of stretcher 31. Rigid flange 11 is secured to the picture frame by a screw 8 passed through aperture 13, thereby serving as an anchor member to support the resilient flange 21 and enable it to serve as a retainer member for the stretcher.

Figure 4 represents the condition in which rear face 32 of stretcher 31 and rear face 52 of picture frame 50 are flush or substantially flush. The flush condition may result either from the fact that the particular stretcher is of reduced thickness (from front face 33 to rear face 32) or from the fact that the ledge 53 of the picture frame is recessed to a greater extent (designated 54), or for both reasons. The improved fastener device is adjusted for the rearwardly flush condition of Figure 4 by angularly turning the two members so that their long flanges are aligned in the same plane, resulting in a T-shaped structure in which the short flanges constitute the short vertical stem. The T-shaped device is positioned with the short flanges 12, 22 disposed within the narrow space 7 separating the recess wall 55 of the picture frame and the side wall 34 of stretcher 31, so that the long flanges 11, 21 rest on the rear faces 52, 32 of the picture frame and stretcher. Rigid flange 11 is secured to the picture frame by screw 8.

In both Figures 3 and 4 it will be observed that the distal end 21b of the resilient flange 21 rests on the stretcher. The purpose of making one of the members, such as 20, resilient is to enable the same fastener device to accommodate a wider variation in the distance between the rear face 32 of the stretcher and the rear face 52 of the picture frame for both the rearwardly projecting condition of Figure 3 and the substantially flush condition of Figure 4. However, it is within the contemplation of the invention to make both members rigid (as is member 10) or to make both members resilient (as is member 20).

Figure 5 represents the third condition, in which the rear face of the picture-bearing member is depressed within the ledge recess forwardly of the rear face of the picture frame. This condition may arise where the picture-bearing member is relatively thin or where the ledge is recessed a considerable extent from the rear face of the picture frame. The condition occurs most frequently when a mirror or a canvas board is to be framed, and this has been shown in Figure 5 wherein the rear face 62 of canvas board 60 resting on ledge 53 of the picture frame is depressed forwardly from the rear face 52 of the frame a distance designated 6. The improved fastener device is adjusted for the forwardly depressed condition of Figure 5 by angularly turning the two members in the Z-shape as above described in connection with Figure 3, but the device is inverted so that the rigid flange 11 (at the left in all Figures 3, 4 and 5) constitutes the upper leg, and resilient flange 21, the lower leg, of the Z shape. The device is positioned with the short flanges within the depression between rear face 62 of the board and rear face 52 of the picture frame and disposed close to recess wall 55 of the picture frame. This causes the rigid flange 11 to rest on rear face 52 of the frame and the resilient flange 21 to rest on rear face 62 of the canvas board, as in previous Figures 3 and 4. But it will be noted that in Figure 5 the distal end 21b is in spaced relation to the board, so that contact with the board is made at the proximal portion 21c of the resilient flange.

Figure 6:
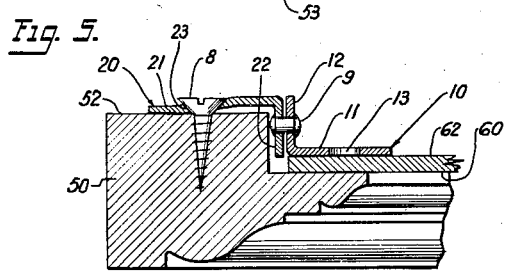
Figure 6 is a view similar to Figure 5, but showing a slightly modified form.

The depressed condition of Figure 5 is also represented in Figure 6, in which the fastener device is positioned in a manner somewhat different from that of Figures 3, 4 and 5, in that the rigid flange 11 rests on the canvas board and the resilient flange 21 rests on the picture frame. In this case the resilient flange 21 is provided with an aperture 23 for a screw 8 for securement to the picture frame. In the preferred form of this modification, both long flanges have apertures for screws, so that the device may be used in either the manner of Figure 5 or of Figure 6.

The device when comprised of two rigid members or two resilient members may likewise have an aperture in each long flange, so that either flange may rest on the picture frame and be secured thereto.

It will be observed that the flat distal end 21b of the flange 21 is in contact with the rear face of either the mounting or frame in the arrangements shown in Figures 3, 4 and 6. The arrangements are hence such that there are no rearwardly protruding parts to injure rearwardly stacked pictures.

Although the L-shaped members have been shown as constituted of a long and a short flange, it is within the contemplation of the invention to make the flanges of any other relative proportions as may suit a particular case.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except in so far as such limitations are specified in the appended claims.

I claim:

1. A universal fastener device for securing canvas mountings of different thickness in picture frames having their recessed ledge disposed at different distances from the rear face of the frame, said universal fastener device comprising a pair of angle members each having a long flange and a short flange, the said short flanges being disposed in face to face relation and pivotally articulated, the said long flanges having apertures near their distal ends, said pair of members being mutually adjustable into three different positions, one in which their long flanges are in alignment in a single plane, and two other positions in which said long flanges are in spaced planes and extending in oppositely disposed directions, whereby in each of said positions one of the long flanges overlies the rear face of the picture frame and the other long flange overlies the rear face of the canvas mounting, and screw means inserted in the said aperture of one of the long flanges for securing the same to the rear face of the picture frame.

2. A universal fastener device for securing inserts of different thickness in picture frames having a recessed ledge of different depths, said universal fastener device comprising a pair of angle members, each having a leg in facing relation to an adjacent leg of the other member, the other legs of the members extending outwardly and oppositely, the said adjacent legs being pivotally articulated and at least one of the said extended legs having an aperture, said pair of members being mutually adjustable into three different positions, one in which the extended legs are in alignment in a single plane, and two other positions in which said extended legs are in spaced planes, whereby in each of said positions one of said extended legs overlies the rear face of the picture frame and the other of said extended legs overlies the rear face of the insert, and screw means inserted in the said aperture of one of the extended legs for securing the same to the rear face of the picture frame.

3. A universal fastener device for securing inserts of different thickness in picture frames having a recessed ledge of different depths, said universal fastener device comprising a pair of angle members, each having a leg in facing relation to an adjacent leg of the other member, the other legs of the members extending outwardly and oppositely, the said adjacent legs being pivotally articulated, one of the members being fabricated of rigid material and the other member, of resilient material, said pair of members being mutually adjustable into three different positions, one in which the said extended legs are in alignment in a single plane, and two other positions in which said extended legs are in spaced planes, whereby in each of said positions the said rigid extended leg overlies the rear face of the picture frame and the said resilient leg overlies the rear face of the insert, the said rigid extended leg having an aperture, and screw means inserted in the said aperture for securing the rigid member to the rear face of the picture frame.

SAMUEL BRECHER.

REFERENCES CITED

The following references are of record in the file of this patent:

UNITED STATES PATENTS

| Number | Name | Date |
| --- | --- | --- |
| 509,626 | Patterson | Nov. 28, 1893 |
| 753,967 | Eustis | Mar. 8, 1904 |
| 1,688,953 | Yeager | Oct. 23, 1928 |
| 2,182,480 | Lowry | Dec. 5, 1939 |